United States Patent [19]

Friske et al.

[11] Patent Number: 5,254,000
[45] Date of Patent: Oct. 19, 1993

[54] ORGANIC POLYMER LENS MOLD

[75] Inventors: Mark S. Friske, Corning, N.Y.; Paul W. Hollon; Donald L. Keyes, both of Cincinnati, Ohio; Frederick E. Noll, Big Flats, N.Y.

[73] Assignee: Corning Incorporated, Corning, N.Y.

[21] Appl. No.: 872,453

[22] Filed: Apr. 23, 1992

[51] Int. Cl.[5] .............. B29C 33/34; B29C 39/40
[52] U.S. Cl. .................... 425/595; 425/423; 425/808; 249/134; 264/2.3
[58] Field of Search .......... 425/408, 595, 808, 412, 425/716, 555, 423; 249/134, 121, 127, 95, 163, 165, 167, 154; 264/2.2, 2.3

[56] References Cited

U.S. PATENT DOCUMENTS

| 2,542,386 | 2/1951 | Beattie | 425/808 |
| 2,728,106 | 12/1955 | Herman et al. | 425/808 |
| 3,806,079 | 4/1974 | Beattie et al. | 249/126 |
| 3,830,460 | 8/1974 | Beattie | 249/134 |
| 3,871,803 | 3/1975 | Beattie | 425/175 |
| 3,902,693 | 9/1975 | Crandon et al. | 249/134 |
| 4,095,772 | 6/1978 | Weber | 249/82 |
| 4,197,266 | 4/1980 | Clark et al. | 264/1 |
| 4,211,384 | 7/1980 | Bourset et al. | 425/808 |
| 4,227,673 | 10/1980 | Goodwin et al. | 249/117 |
| 4,247,492 | 1/1981 | Neefe | 264/2.3 |
| 4,284,399 | 8/1981 | Newcomb et al. | 425/808 |
| 4,457,880 | 7/1984 | Neefe | 264/1.4 |
| 4,614,624 | 9/1986 | Neefe | 425/808 |
| 4,793,703 | 12/1988 | Fretz, Jr. | 351/163 |
| 4,806,287 | 2/1989 | Sulc et al. | 425/808 |
| 4,815,690 | 3/1989 | Shepherd | 425/808 |
| 4,906,422 | 3/1990 | Buckley | 264/2.5 |
| 4,955,580 | 9/1990 | Seden et al. | 249/82 |
| 5,064,712 | 11/1991 | Fretz, Jr. | 428/212 |
| 5,137,441 | 8/1992 | Forgarty | 425/808 |
| 5,143,660 | 9/1992 | Hamilton et al. | 264/2.2 |

FOREIGN PATENT DOCUMENTS

| 1511901 | 5/1978 | United Kingdom . |
| 2216065 | 10/1989 | United Kingdom . |
| 2226977 | 7/1990 | United Kingdom . |
| 2230730 | 10/1990 | United Kingdom . |

Primary Examiner—Khanh P. Nguyen
Attorney, Agent, or Firm—M. M. Peterson

[57] ABSTRACT

A mold for an organic polymer, ophthalmic lens element has separate upper and lower mold members with each mold member being composed of a thermoplastic polymer. The lower mold member has a central, bowl-shaped cavity with contours that conform to those of a lens to be molded therein, and has an annular rim surrounding the upper edge of the cavity. The upper member has a central portion with an under surface that corresponds in contour to that of the upper surface of the lens to be molded, and has an annular rim that surrounds the central portion and rests on the annular rim of the lower member when the two members are assembled.

11 Claims, 3 Drawing Sheets

5,254,000

ORGANIC POLYMER LENS MOLD

FIELD OF THE INVENTION

The field is organic polymer, ophthalmic lens elements and molds for producing lens elements.

BACKGROUND OF THE INVENTION

The present invention is concerned with production of ophthalmic lens elements composed of a cured organic monomer formulation. The element may be an all-plastic lens cast from a thermosetting formulation, such as an epoxide, or the widely used allylic carbonate available from PPG Industries, Pittsburgh, Pa. under the trademark CR-39. It may also be a rigid plastic element that is combined with a thin glass element to form a laminated lens. Such a lens is described in detail in U.S. Pat. No. 4,793,703 and No. 5,064,712 (Fretz, Jr.).

Currently, organic lenses are produced by filling a cavity with a liquid monomer containing known polymerizing additives. The cavity may be formed by an assembly of two glass mold members held in spaced relationship by a flexible gasket.

The surface contours of the two mold members will be precisely the reverse of the surface contours desired on the organic lens. As a result, the prescription power and surface finish quality of an organic ophthalmic lens rely entirely on the finished accuracy of the glass mold members against which the lens is formed.

Production of the glass mold members is a very specialized, and hence expensive, operation that requires frequent inspections and measurements to achieve the necessary accuracy. Moreover, the polished glass mold members are very prone to damage. Therefore, mold life is quite unpredictable, and may vary from one or two castings to as many as a few hundred. Hence, constant checking of mold surfaces is a necessity, as is maintaining a substantial inventory of mold members for replacement.

The gasketed glass mold approach also entails certain technical disadvantages. A mold release coating must be applied to the glass surfaces, or in the monomer formulation, to avoid adhesion of the cured polymer to the glass. Also, because of a difference in expansion characteristics of the mold materials, leakage of the uncured monomer formulation may occur as the assembly is heated in the early part of a curing cycle.

It is, therefore, a basic purpose of the present invention to provide an improved mold for producing organic polymer, ophthalmic lens elements. The improved mold is inexpensive to produce, and hence disposable. It also provides superior physical properties.

SUMMARY OF THE INVENTION

Our invention is a mold for an organic polymer, ophthalmic lens element. The mold is characterized by separate upper and lower members with each mold member being composed of a thermoplastic polymer. The lower mold part has a central, bowl-shaped cavity with contours that conform to those of the ophthalmic lens to be molded therein. The lower part also has an annular rim surrounding the upper edge of the cavity. The upper member has a central portion with an under surface that corresponds in contour to that of the upper surface of the ophthalmic lens to be molded. It also has an annular rim that surrounds the central portion and rests on the annular rim of the bottom member when the two members are assembled.

In specific embodiments, the mold members are injection molded, polyolefin polymers. Preferably, the polyolefin is polypropylene or polymethylpentene with both mold members being molded from the same polymer and having a low polarity and a melt point sufficiently high so that the mold does not melt or distort when the lens is cured. The mold members will have parts that cooperate to tightly lock the members together when assembled.

PRIOR ART

Various three-piece arrangements, of a gasket and spaced, glass mold plates, are disclosed in U.S. Pat. No. 2,728,106 (Herman et al.), No. 3,902,693 (Crandon et al.), No. 4,227,673 (Goodwin et al.) and No. 4,906,422 (Buckley). These typify current practice.

U.S. Pat. No. 4,095,772 (Weber) describes a plastic mold assembly composed of upper and lower members and a spacer ring. The upper mold member is supported, on the surface of the lens formulation to be cured, by a combination of the spacer ring and a plurality of ears that extend from the upper mold member. The ears flex as the upper mold member is drawn down when the lens formulation solidifies.

U.S. Pat. No. 3,830,460 (Beattie) describes producing plastic replica mold members against glass or metal master molds. The replica members are assembled in a traditional three-piece arrangement to cast plastic ophthalmic lenses. The patent teaches selection of materials for forming the replica members.

U.S. Pat. No. 3,806,079 (Beattie) describes a mold assembly similar to that in the -460 patent, except that the replica members are plaques embodying a plurality either upper or lower mold parts. The plaques are then assembled with spacer gaskets for casting a plurality of lenses.

While of interest, these patents are not considered relevant to the present invention. They do not disclose a two-member, plastic mold adapted to be assembled in a leak-proof assembly.

DESCRIPTION OF THE INVENTION

Figure 1:
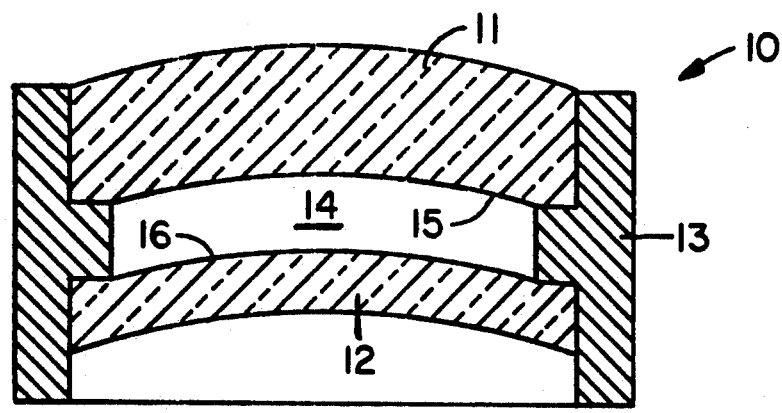
FIG. 1 is a view in cross-section of a typical, gasketed glass mold as heretofore employed in producing an organic polymer, ophthalmic lens.

FIG. 1 illustrates a typical, gasketed glass mold 10 as currently used in casting organic polymer, ophthalmic lens elements. Mold assembly 10 comprises two spaced glass mold members 11 and 12. Members 11 and 12 are maintained in spaced relationship by a flexible gasket member 13. Assembly 10 provides a cavity 14 into which a liquid monomer formulation may be cast to cure. Mold member 11 is a fused glass body having a continuous, concave inner surface 15. Mold member 12 likewise has a continuous inner surface 16, but the surface is convex. This provides a substantially uniform thickness in a cast lens element. The inner surface contours on members 11 and 12 will be the reverse of those desired on the cast ophthalmic lens element.

Figure 2:
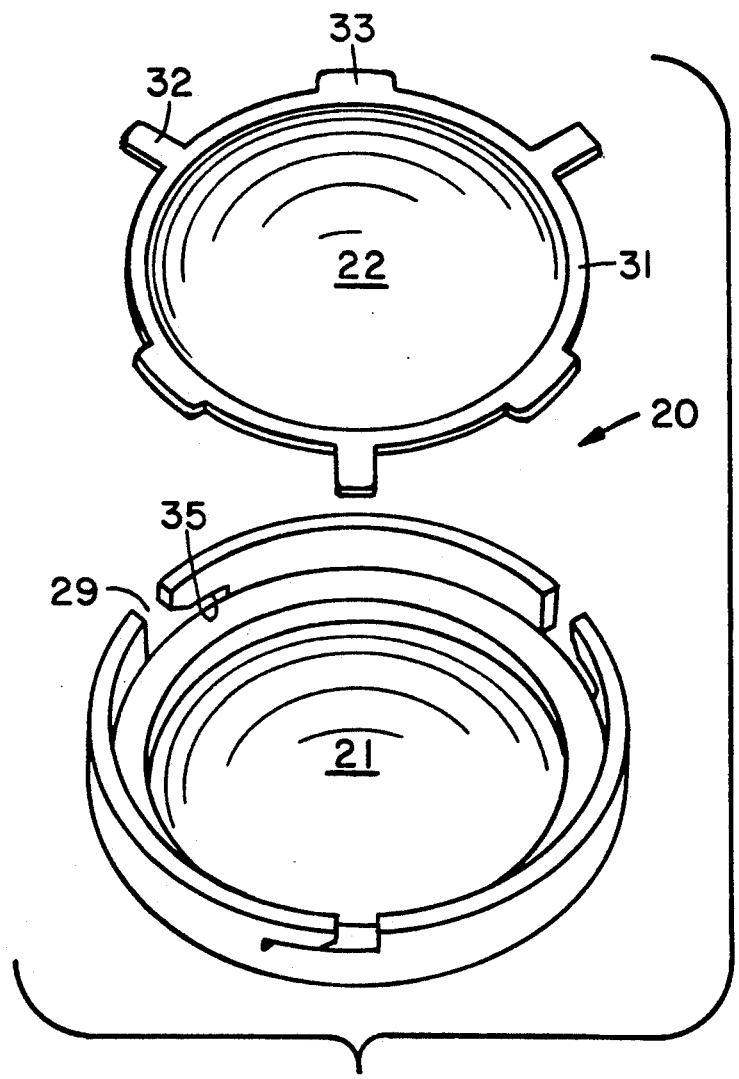
FIG. 2 is an exploded, perspective view of a mold assembly in accordance with the present invention.

FIG. 2 is an exploded perspective view of a two-piece mold assembly 20 in accordance with the present invention. Mold assembly 20 is composed of a lower member 21 and an upper member 22.

Figure 3:
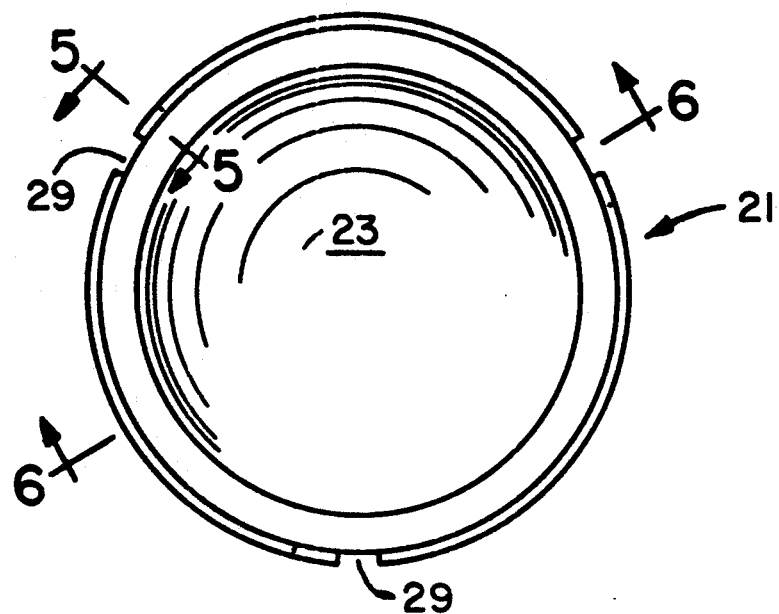
FIG. 3 is a top plan view of the lower mold member of FIG. 2.
Figure 6:
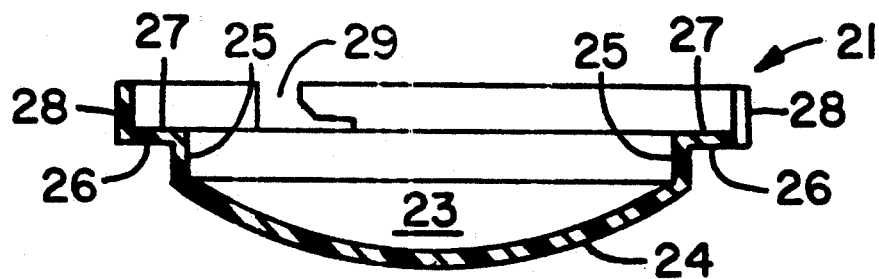
FIG. 6 is a view in cross-section taken along line 6—6 of FIG. 3.

FIG. 3 is a top plan view of lower member 21 of mold assembly 20. A view in cross-section along line 6—6 in lower member 21 is shown in FIG. 6. Lower member 21 is a bowl-shaped, hollow body. Except for the upper lens surface, member 21 essentially defines the contours of the organic polymer lens to be cast.

As shown, member 21 forms a cavity 23, the bottom of which defines the convex surface on a cast lens. Rising vertically from bottom portion 24 of mold member 21 is an annular wall 25 which defines the edge or periphery of a cast lens. Wall 25 terminates in a horizontal, outwardly extending, annular ledge 26 having a flat upper surface 27 upon which upper part 22 rests as described later. Arising from the outer edge of ledge 26 is another vertical, annular wall 28. Wall 28 is shown as having three L-shaped cutouts 29, the purpose of which will become apparent. Cutouts 29 are identical in shape and located at 120° intervals It will be appreciated that, while we prefer three cutouts, two may suffice, and more than three might be employed.

Figure 5:
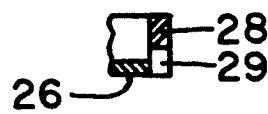
FIG. 5 is a view in cross-section taken along line 5—5 of FIG. 3.

FIG. 5 is a view in cross-section taken along line 5—5 in FIG. 3. This view is taken through a cutout 29 in wall 28.

Figure 4:
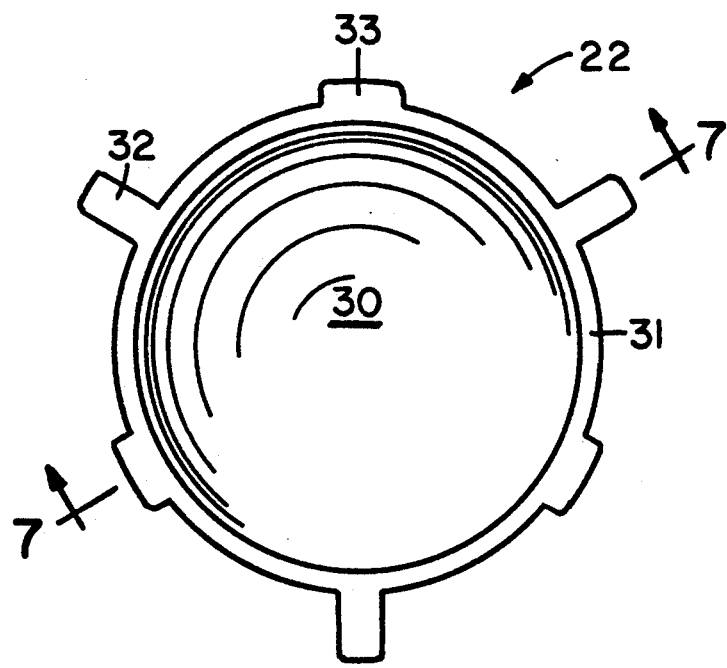
FIG. 4 is a top plan view of the upper mold member of FIG. 2.
Figure 7:
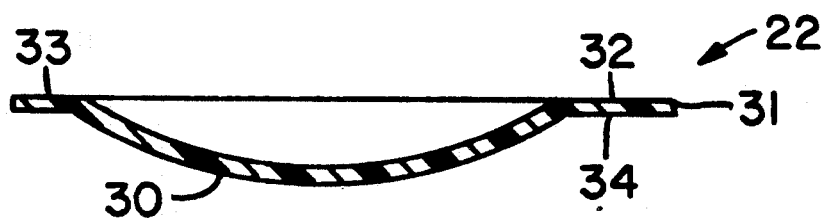
FIG. 7 is a view in cross-section taken along line 7—7 of FIG. 4.
Figure 8:
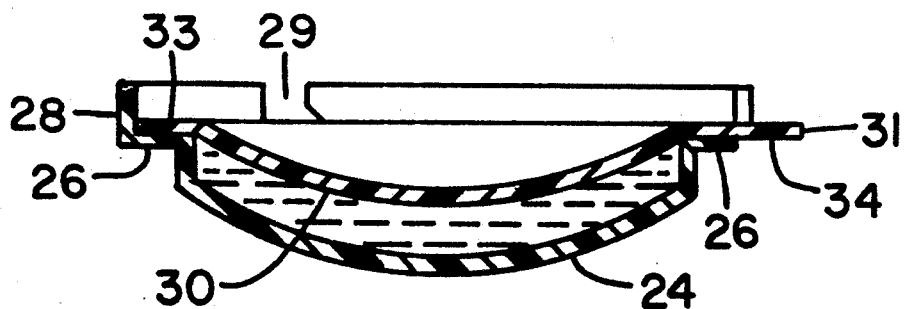
FIG. 8 is a view in cross-section of the mold assembly of FIG. 2 in assembled form.

FIG. 4 is a top plan view of upper member 22 of mold assembly 20. A view in cross-section along line 7—7 is shown in FIG. 7. Upper member 22 is essentially a flat sheet shown with a depressed, circular center portion 30. Center portion 30 is surrounded by an annular horizontal border 31 with flat tabs 32 and extensions 33 extending from its outer edge. Tabs 32 and extensions 33 are shown as three in number and extending at 120° intervals. Again, this is a matter of preference, except as now explained.

Both the number of tabs 32 and their spacing must correspond to the number and spacing of cutouts 29 in wall 28 of lower member 21. This is essential for mold 20 to properly function. The following brief description of mold 20 in operation will make this apparent.

Lower member 21 of mold 20 may be positioned with its base 24 resting in a suitable holder (not shown). A monomer formulation, selected to provide the desired lens element on curing, is then introduced into cavity 23 of member 21 to a point just below the upper edge of wall 25. Upper part 22 is then positioned with the under surface 34 of border 31 resting against the upper surface 27 of ledge 26. Also upper part 22 is so positioned that tabs 32 enter through the vertical legs of cutouts 29. Upper member 22 is then rotated so that tabs 32 fit snugly into the horizontal legs 35 of cutouts 29. This forms a tight leak-proof assembly of members 21 and 22 as under surface 34 of border 31 is drawn tightly against the upper surface 27 of ledge 26 on lower member 21. To this end, the thickness of tab 32 should equal the height of the horizontal legs 35 on cutouts 29. To facilitate a tight fit, the upper surface of the horizontal legs 35 may be very slightly beveled.

Central portion 30 of upper member 22 rests on the monomer formulation in the cavity 23 of lower member 21. Central portion 30, being depressed in the monomer formulation, forces the liquid outwardly to completely fill the cavity. Extensions 32 are uniform in shape, and of such size as to center upper member 22 in lower member 21. It will be appreciated that border 31 might be enlarged to the same width overall as it has in extensions 33. However, such construction is less easy to use and requires more material.

Mold members 21 and 22 will both be composed of an organic polymer. Preferably, the same polymer will be employed for each, both as a matter of convenient production and so that the members expand evenly as they are heated in the curing cycle. This avoids the leaks that occur when materials having different expansion characteristics are employed in molds.

The polymer employed must be a high temperature polymer having a melt point above the top temperature reached in the curing cycle of the monomer formulation. The polymer must also have a sufficiently low polarity so that adhesion between the mold polymer and the lens formulation does not occur as the latter cures. This avoids the current need for a mold release coating to avoid such adhesion to glass parts.

The organic polymer mold members of this invention are easily produced by injection molding from relatively inexpensive materials. This not only provides a disposable mold that obviates cleaning costs, but also permits easily changing lens contours and types. For example, only the injection molding machine tool need be modified to produce such lens variants as aspheric lenses or blanks with countersinks to receive a multifocal segment.

Buildup of an electrostatic charge commonly occurs in polymeric materials, especially when a material is injection molded or cast. To avoid this in the present mold members, an antistatic additive may be included in the mold polymer. This is important to reduce the tendency of either the mold or the cast lens to attract contaminating materials from the atmosphere that might render a cast lens unusable.

Particularly suitable materials to use in producing mold members are the polyolefins, such as polypropylene and polymethylpentene. Also of interest are fluorocarbons, such as FEP and polyvinylidene fluoride. However, the fluorocarbons are more expensive and more difficult to mold For higher temperature curing, for example at temperatures up to 175° C., polymethylpentene is preferred because of a high melt point. Polypropylene is more readily available, and hence preferred for use when the curing temperature does not exceed about 160° C.

Our invention provides an inexpensive, disposable mold assembly for use in casting and curing organic polymer, ophthalmic lens elements. It avoids prior monomer leakage problems during the curing cycle, and does not require a mold release agent on the mold walls. The mold may be used to cast the rigid resin member used in a glass-plastic, laminated lens as described in the Fretz, Jr. patents noted earlier. It may also be used to replace gasketed glass molds now used in casting all-plastic lenses.

We claim:

1. A mold for an organic polymer, ophthalmic lens element comprising separate upper and lower mold members, each mold member being composed of a thermoplastic polymer, the lower mold member comprising a bottom portion having a surface contour that corresponds to, but is the reverse of, a surface contour on the lens element being molded, and an annular wall rising vertically from an outer edge of the surface contour of the bottom portion and defines the periphery of a central, bowl-shaped cavity with contours that conform to those of an ophthalmic lens to be molded therein, and an annular rim extending radially and outwardly from an upper end portion of the vertical annular wall, the upper mold member having a central portion with an under surface that corresponds in contour to that of the upper surface of the ophthalmic lens to be molded, and with an annular rim that surrounds the central portion and that rests on the annular rim of the lower member when the two members are assembled, the annular rim on the upper mold member has a smaller outer diameter than the outer diameter of the annular rim on the lower mold member and the rim on the upper member has spaced projections which extend to the upstanding wall extending from the outer edge of the lower annular rim when the members are assembled, thereby centering the upper member within the lower member.

2. A mold in accordance with claim 1 wherein the thermoplastic mold polymer is a polyolefin.

3. A mold in accordance with claim 1 wherein the thermoplastic mold polymer is selected from the group consisting of polymethylpentene, polypropylene and fluorocarbons.

4. A mold in accordance with claim 2 wherein the selected polyolefin is polypropylene.

5. A mold in accordance with claim 1 wherein the thermoplastic mold polymer has a low polarity whereby the lens polymer does not bond to the mold polymer during curing of the lens polymer.

6. A mold in accordance with claim 1 wherein the thermoplastic mold is composed of a high temperature polymer whereby the mold does not melt during the curing cycle of the lens polymer.

7. A mold in accordance with claim 1 wherein the upper and lower mold parts are molded from the same organic formulation whereby they expand evenly throughout the lens curing process.

8. A mold in accordance with claim 1 wherein the annular rim on the upper mold member has a flat under surface, the annular rim on the lower mold member has a flat upper surface, and the two flat surfaces engage each other when the mold members are assembled.

9. A mold in accordance with claim 1 wherein the mold has means for locking the upper mold member tightly against the lower mold member when the mold members are assembled.

10. A mold for an organic polymer, ophthalmic lens element comprising separate upper and lower mold members, each mold member being composed of a thermoplastic polymer, the lower mold member comprising a bottom portion having a surface contour that corresponds to, but is the reverse of, a surface contour on the lens element being molded, and an annular wall rising vertically from an outer edge of the surface contour of the bottom portion and defines the periphery of a central, bowl-shaped cavity with contours that conform to those of an ophthalmic lens to be molded therein, and an annular rim extending radially and outwardly from an upper end portion of the vertical annular wall, the upper mold member having a central portion with an under surface that corresponds in contour to that of the upper surface of the ophthalmic lens to be molded, and with an annular rim that surrounds the central portion and that rests on the annular rim of the lower member when the two members are assembled, the mold having means for locking the upper mold member tightly against the lower mold member when the mold members are assembled, the locking means being a plurality of flat tabs that project from the annular rim on the upper mold member at spaced intervals, and that cooperate with L-shaped cutouts in a wall upstanding from the outer edge of the annular rim portion on the lower mold member within which the upper mold member rests when assembled.

11. A mold in accordance with claim 10 wherein the L-shaped cutouts have a horizontal leg that is substantially the same height as the thickness of the flat tabs on the rim on the upper mold member, and are so shaped that the flat tabs lock tightly therein when the upper mold member is rotated.

* * * * *